May 30, 1961 A. W. CARLSON 2,986,658

BINARY COUNTER HAVING GATING MEANS TO PREVENT REVERSAL OF MORE THAN ONE STAGE DURING EACH INPUT

Filed Aug. 29, 1958 3 Sheets-Sheet 1

INVENTOR.
ARTHUR W. CARLSON
BY Wade Koontz and Martin J. Finnegan
ATTORNEYS

May 30, 1961 A. W. CARLSON 2,986,658

BINARY COUNTER HAVING GATING MEANS TO PREVENT REVERSAL OF MORE THAN ONE STAGE DURING EACH INPUT

Filed Aug. 29, 1958 3 Sheets-Sheet 2

INVENTOR.
ARTHUR W. CARLSON
BY
Wade Koontz and
Martin J. Finnegan
ATTORNEYS

May 30, 1961 A. W. CARLSON 2,986,658

BINARY COUNTER HAVING GATING MEANS TO PREVENT REVERSAL OF MORE THAN ONE STAGE DURING EACH INPUT

Filed Aug. 29, 1958 3 Sheets-Sheet 3

INVENTOR.
ARTHUR W. CARLSON

BY Wade Koontz and Martin J. Finnegan

ATTORNEYS

United States Patent Office 2,986,658
Patented May 30, 1961

2,986,658

BINARY COUNTER HAVING GATING MEANS TO PREVENT REVERSAL OF MORE THAN ONE STAGE DURING EACH INPUT

Arthur William Carlson, Harrison, Maine, assignor to the United States of America as represented by the Secretary of the Air Force Filed Aug. 29, 1958, Ser. No. 758,168

4 Claims. (Cl. 307—88.5)

(Granted under Title 35, U.S. Code (1952), sec. 266)

The invention described herein may be manufactured and used by or for the United States Government for governmental purposes without payment to me of any royalty thereon.

This invention relates to counting operations, and particularly to methods and means for registering a count by the processing of electrical pulses having a repetition rate extending into the megacycle range.

Heretofore high speed pulse counters, operating on the "two-value" principles of the binary code, have been prone to the development of erroneous counts, the error tendency being inherent in the mode of operation, particularly that feature of the count shift process which introduces sharp fluctuations in electrical load, from one counting step to the next, whenever the count sequence is such as to sharply increase or decrease the number of counting stages that must undergo position-reversal in order to register the correct digital total. Thus, if the counting chain consists of five bistable stages, with each stage being embodied in a two-state binary unit ("flip-flop") the stepping of the count from a given binary value to the next may involve a change in state for only one of the five flip-flop units; yet on the very next pulsing step it may be necessary for all five units to undergo reversal—for example, from digital values 0—1—1—1—1 to 1—0—0—0—0. These sharp variations in pulse patterns, when they occur with micro-second frequency, impose electrical loading problems that are difficult to manage, especially when the circuitry includes gating devices for the simultaneous switching of all stages requiring switching on any given count.

The present invention provides a method and means for significantly lessening the incidence of switching transients and spurious pulses in a multi-stage digital counting chain, the method being characterized by incorporating into the counting scheme a count-shifting procedure of novel concept, namely, the concept of electrically gating the flow of stage-changing pulses to the successive binary stages in such manner that not more than one stage of the chain is caused to undergo a change in state ("0" to "1," or "1" to "0") for any single count increment.

Another characteristic of the invention is the provision of a combination of junction transistors and pulse gating devices interrelated in a novel circuit structure to achieve the indicated results.

These and other objects and characteristics of the invention will be apparent upon examination of the following description of the embodiment of the invention illustrated in the accompanying drawings wherein.

Figure 1:
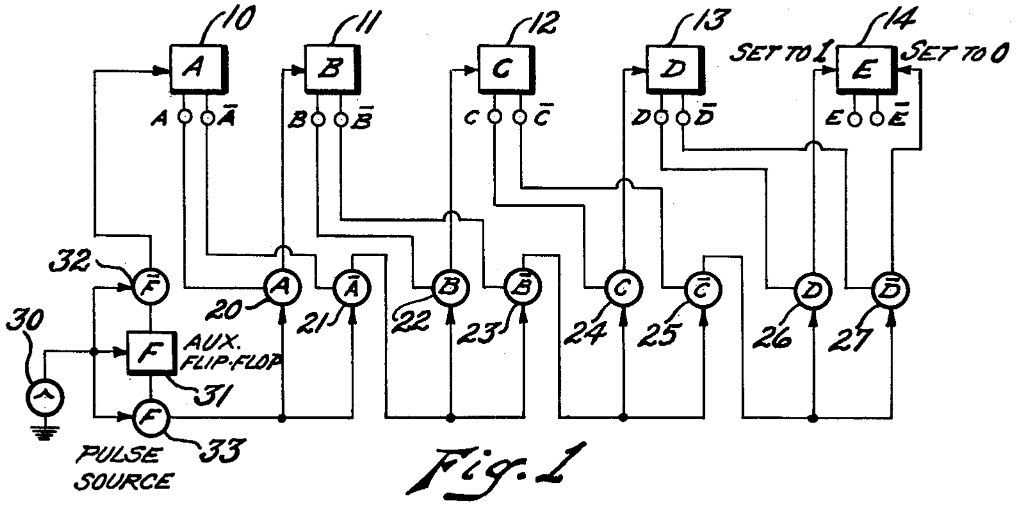
Fig. 1 is a diagram, in block form, of circuitry embodying the invention.

Referring first to Fig. 1, bistable units 10 to 14, inclusive, and gates 20 to 27, inclusive, are inter-related to convert successive pulses from source 30 into a progressive digital count in a binary form that deviates from the conventional binary code, in that in moving from one binary total to the next it is never necessary to change the individual digital representations of more than one of the counting stages. For example, in a five-stage counter, as illustrated, the successive counting patterns are as follows:

| Count | Stage | | | | | Stage Changing State |
|---|---|---|---|---|---|---|
| | A | B | C | D | E | |
| 0 | 0 | 0 | 0 | 0 | 0 | Initial State |
| 1 | 1 | 0 | 0 | 0 | 0 | A |
| 2 | 1 | 1 | 0 | 0 | 0 | B |
| 3 | 0 | 1 | 0 | 0 | 0 | A |
| 4 | 0 | 1 | 1 | 0 | 0 | C |
| 5 | 1 | 1 | 1 | 0 | 0 | A |
| 6 | 1 | 0 | 1 | 0 | 0 | B |
| 7 | 0 | 0 | 1 | 0 | 0 | A |
| 8 | 0 | 0 | 1 | 1 | 0 | D |
| 9 | 1 | 0 | 1 | 1 | 0 | A |
| 10 | 1 | 1 | 1 | 1 | 0 | B |
| 11 | 0 | 1 | 1 | 1 | 0 | A |
| 12 | 0 | 1 | 0 | 1 | 0 | C |
| 13 | 1 | 1 | 0 | 1 | 0 | A |
| 14 | 1 | 0 | 0 | 1 | 0 | B |
| 15 | 0 | 0 | 0 | 1 | 0 | A |
| 16 | 0 | 0 | 0 | 1 | 1 | E |
| 17 | 1 | 0 | 0 | 1 | 1 | A |
| 18 | 1 | 1 | 0 | 1 | 1 | B |
| 19 | 0 | 1 | 0 | 1 | 1 | A |
| 20 | 0 | 1 | 1 | 1 | 1 | C |
| 21 | 1 | 1 | 1 | 1 | 1 | A |
| 22 | 1 | 0 | 1 | 1 | 1 | B |
| 23 | 0 | 0 | 1 | 1 | 1 | A |
| 24 | 0 | 0 | 1 | 0 | 1 | D |
| 25 | 1 | 0 | 1 | 0 | 1 | A |
| 26 | 1 | 1 | 1 | 0 | 1 | B |
| 27 | 0 | 1 | 1 | 0 | 1 | A |
| 28 | 0 | 1 | 0 | 0 | 1 | C |
| 29 | 1 | 1 | 0 | 0 | 1 | A |
| 30 | 1 | 0 | 0 | 0 | 1 | B |
| 31 | 0 | 0 | 0 | 0 | 1 | A |
| 32 | 0 | 0 | 0 | 0 | 0 | E |

By reference to the final column of the foregoing table, it will be seen that not more than one stage changes state in response to each new pulse reception. While the table illustrates the code as applied to a five-stage counter, the coding scheme is not limited in this respect. No matter how long the counter, only one at the most changes state at a given count. For example, if it is desired to extend the code to a six-stage counter with a sixth stage F, the columns may be lengthened to accommodate a count of 64 by writing the five-stage code in reverse order beneath the original five-stage code starting at count 32; the column F would then consist of "0's" down to count 31, then continue with 32 "1's." Here the cycle repeats. In other words, with the introduction of a sixth stage, the state of addition changes at a count where, prior to the step, the previous stage would have changed state.

In Fig. 1 the rectangular blocks represent the binary elements of the counter (such as flip-flops). By a pulse application these binary elements have their state changed. For example, if stage A is in the state where lead A is high and lead $\overline{A}$ low, the application of a pulse to stage A causes a change of state to lead A low and lead $\overline{A}$ high. The circles represent gates, of which there are 2N, where N is the number of stages. The gates are controlled by the binary elements. The letters labeling the gates indicate the stage and lead controlling them. For example, the gate marked $\overline{B}$ is controlled by the lead $\overline{B}$ of stage B. The arrowheads indicate the path taken by the pulse through a gate when it is enabled. In describing the operation of the counter, it will be assumed that a gate is enabled when the lead controlling it is high. A counter stage will be said to be in the state "1" if the unprimed lead is high, and in the state "0" if the unprimed lead is low (or the primed lead high).

With all stages in the counter initially in the zero state, gate $\overline{F}$ is enabled. When a pulse is obtained from the pulse source it goes through gate $\overline{F}$ to stage A, changing A to the state "1." It also passes directly to auxiliary flip-flop F, changing it to "1," also. After the first pulse, the stage A is "1" and the rest "0," with gates A and F enabled.

The second pulse goes through gates F and A to stage B, making B, "1." It also goes directly to auxiliary flip-flop F, to change F to "0."

The third pulse goes through gate $\overline{F}$ to stage A, changing A from "1" to "0." The fourth pulse changes stage C to "1." The operation may be summarized as follows:

Auxiliary flip-flop F and gates F and $\overline{F}$ function to pass a pulse alternately to the first stage of the counter, as also to the remainder. When gates $\overline{A}$, $\overline{B}$, $\overline{C}$, and D are enabled, a pulse passing through gate F will set stage E to "1" and when gates $\overline{A}$, $\overline{B}$, $\overline{C}$, $\overline{D}$ are enabled and a pulse is passed by gate F, state E will be set to "0." The reason follows: if the auxiliary flip-flop F is considered as part of the counter, then it is possible to have $2^{N+1}$ states; that is, the counter will have another stage, being capable of twice as many states as desired, since it is planned to use N stages to register the count in the indicated code. The last stage could be connected to gate $\overline{C}$ (in Fig. 1) (eliminating gates D and $\overline{D}$) in the same way as the rest of the stages (to complement); this would work properly, provided that all the others and the auxiliary flip-flop were set to "0" (or some other desired state) before the counter was set in operation.

If the counter were not set to the proper state initially, the N stages would proceed to count the indicated code in the reverse order. (This would happen with the last stage connected to complement, if, for example, all were initially in the state "0" and auxiliary flip-flop F in state "1.") To suppress the possibility of the counter's running continuously in the reverse direction, if not set properly in the beginning, is the purpose of connecting the last stage as shown in Fig. 1. Correction procedure follows: let us suppose the counter is initially in the state 01000 and auxiliary flip-flop F in the state "0." Then upon application of the count pulses, the counter will run backwards to the state 00000, and thereafter count in the forward direction. With the last stage connected (Fig. 1), if the counter is cycled by application of count pulses and the auxiliary flip-flop is in the wrong state, the counter will operate backwards to the state 00000 or 00001 (for a five-stage circuit), correct itself, and thereafter count in the forward direction. By setting the device before count pulses are applied, the backward count can be avoided. If it is desired to run the counter in the reverse direction, this may be accomplished by interchanging the set to "0" and set to "1" leads.

Figure 3:
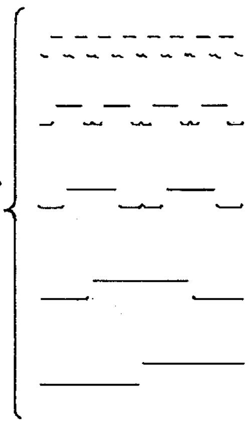
Figs. 3 and 4 are graphs showing wave forms and pulse patterns characteristic of the circuitry of Fig. 1, in actual operation.
Figure 4:
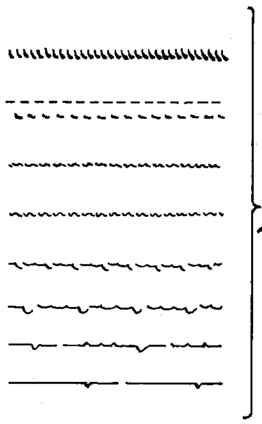
Figure 2:
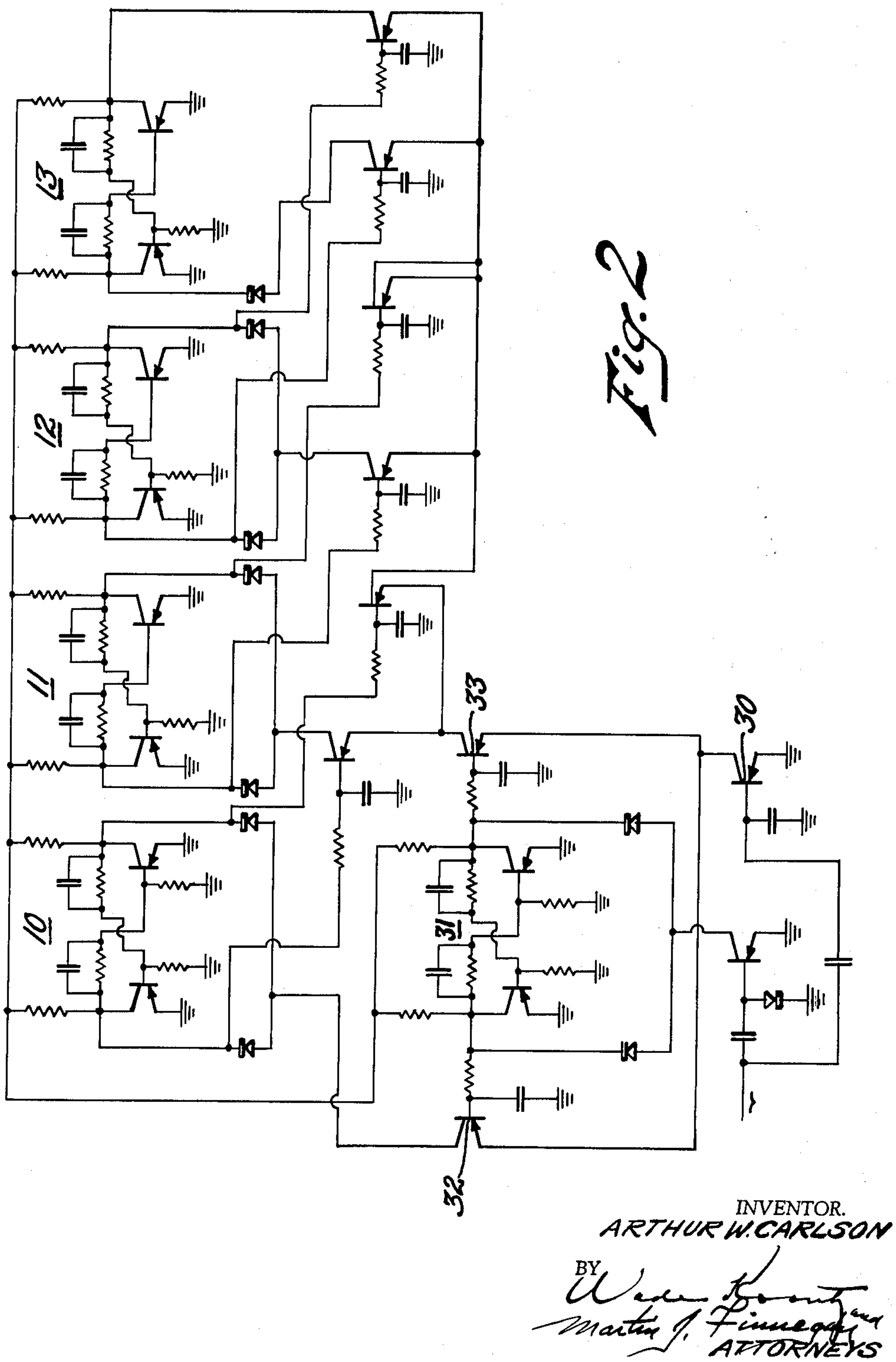
Fig. 2 shows details of the circuitry of Fig. 1.

Fig. 2 is a circuit diagram of four stages of a counter operating with supply voltages ranging from 1.5 to 4.5 volts (which was not exceeded for fear of damaging the transistors), and capable of counting 0.1 $\mu$sec. pulses up to a repetition rate of 4 mc./sec. Fig. 3 is a photograph of the collector waveforms of the first five stages of the counter, counting 0.1 $\mu$sec. pulses at 1 mc. p.r.f. Fig. 4 is a photograph showing the pulses in the counter of Fig. 3. In the first row are the 1-mc. pulses being counted. The remaining waveforms are the pulses going to the second, third, fourth, and fifth stages in that order from the top.

Figure 5:
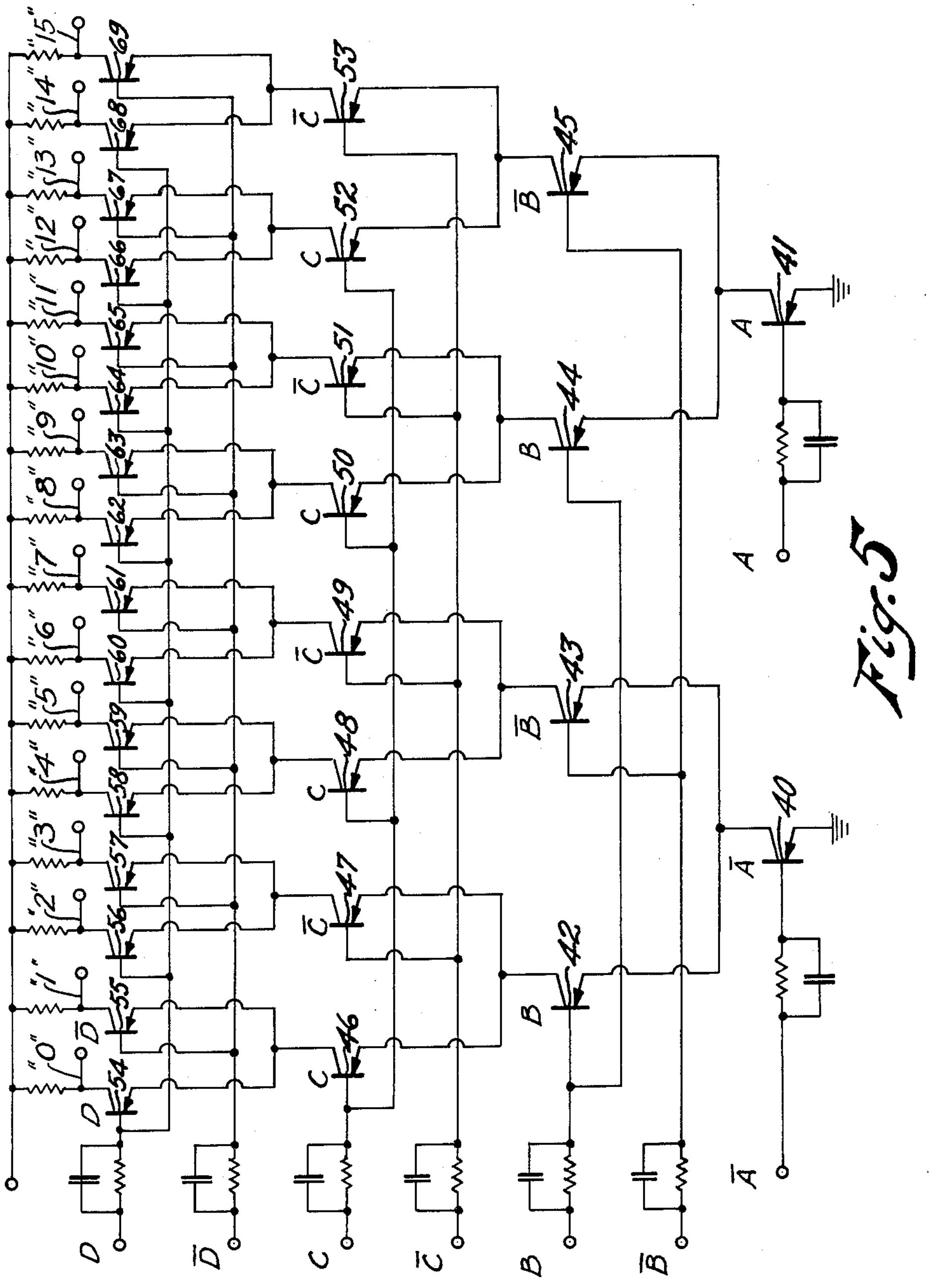
Fig. 5 is a circuit diagram of a selective switching arrangement operable by the circuitry of Figs. 1 and 2.

In the matrix switching pattern illustrated in Fig. 5, the number designating any given one of the output leads—these being the numbers "0" to "15," inclusive—represents the binary number of the counter to which said given output lead responds. The inputs designated $\overline{A}$, A, $\overline{B}$, etc. indicate collectors of the counter stages to which the inputs are connected. Thus, the inputs $\overline{A}$ and A to transistors 40 and 41, respectively, correspond to the inputs $\overline{A}$ and A to gates 21 and 20, respectively, in Fig. 1; similarly, units 42 and 44 of Fig. 5 correspond to unit 22 of Fig. 1; units 43 and 45 to unit 23 of Fig. 1, and so on through tier 46—53 and tier 54—69, with each tier having multiple units, in geometric progression, branching from the preceding tier units, to extend the switching capabilities of the matrix. In view of the non-consecutive characteristics of the counting code governing the operation of the Fig. 1 counter, the matrix switching outputs will not appear in the order shown in Fig. 5; but of course any desired physical re-arrangement of the output leads can be accomplished, to produce whatever physical order is preferred. Reference numerals 40 to 69 designate the successive tiers of transistors comprising the matrix.

What is claimed is:

1. In a binary code counter utilizing -N-binary digits, the combination of a set of -N-bistable counting stages, means for gating electrical pulses to selected counting stages, means responsive to operation of said gating means for producing a digital reversal in one of said counting stages, and means for preventing digital reversals in more than one of said counting stages during any one counting cycle.

2. A counter as defined in claim 1, wherein said bistable stages are constituted by junction transistors, and wherein said gating means also includes junction transistors having their output terminals selectively connected to said bistable stages in such manner that only one of said stages changes state in response to passage of a single counting pulse through said gating means.

3. In a binary code counter for counting either incrementally or decrementally utilizing -N-binary digits, the combination of a set of -N-bistable counting stages, means for gating electrical pulses to selected counting stages, means responsive to operation of said gating means for producing a digital reversal in one of said counting stages, and means for preventing digital reversals in more than one of said counting stages during any one counting cycle.

4. A counter as defined in claim 1, and wherein said gating means includes junction transistors having their output terminals selectively connected to said bistable stages in such manner that only one of said stages changes state in response to passage of a single counting pulse through said gating means.

References Cited in the file of this patent

UNITED STATES PATENTS 2,427,533 Overbeck -------------- Sept. 16, 1947

OTHER REFERENCES

Electronic Engineering, December 1950, pp. 492–498, "The Physical Realization of an Electronic Digital Computer," Booth.

Electronic Engineering, March 1957, pages 136–139, "The Junction Transistor as a Computing Element" (part 3), Wolfendale et al.